Nov. 12, 1940.　　　　E. LEFKOWITZ　　　　2,221,101
LOCKING DEVICE
Filed July 21, 1939
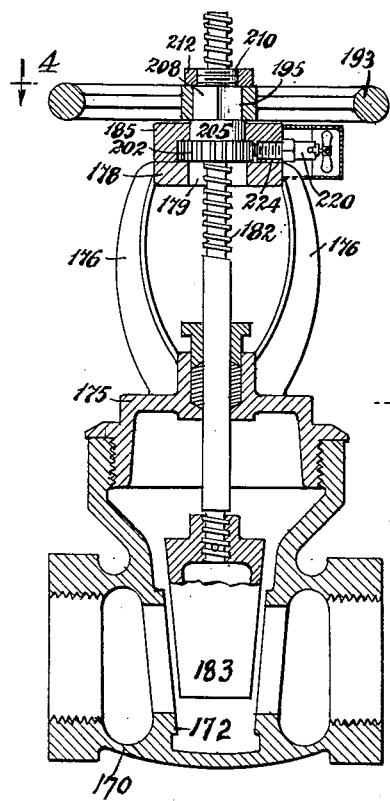
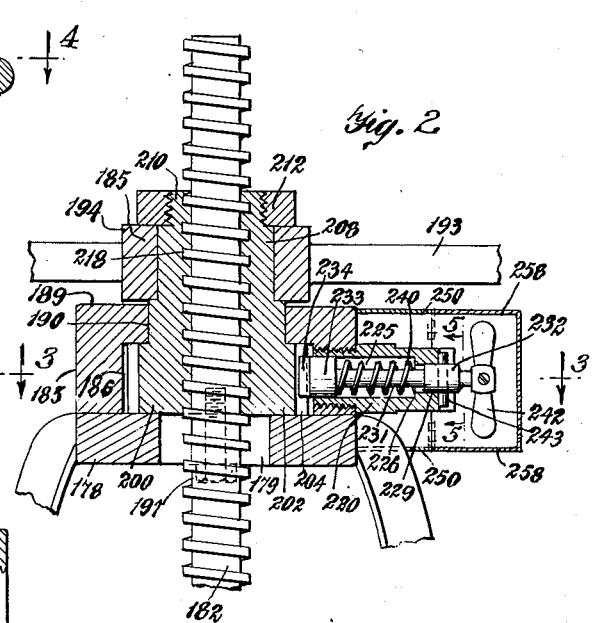
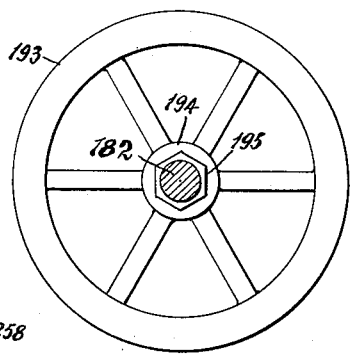
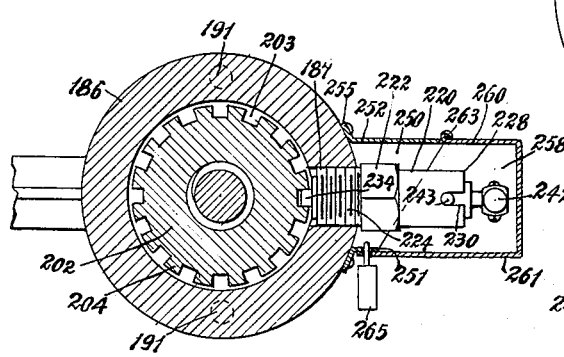
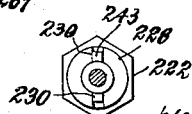
INVENTOR.
EMANUEL LEFKOWITZ
BY A. A. de Bonneville
ATTORNEY.

Patented Nov. 12, 1940

2,221,101

UNITED STATES PATENT OFFICE 2,221,101

LOCKING DEVICE

Emanuel Lefkowitz, Carteret, N. J.

Application July 21, 1939, Serial No. 285,653

4 Claims. (Cl. 74—509)

This invention relates to a locking device.

The object of the invention is the production of a locking device, the essential element of which is an operating screw with means to lock and unlock the same.

The second object of the invention is the production of a locking device specially constructed for an outside screw yoke gate valve.

The third object of the invention is the production of a locking device for a valve which can be detachably locked in position as required.

Other objects of the invention will be evident from the application submitted herewith.

In the drawing Fig. 1 represents an elevation of the locking device connected to an outside screw and yoke gate valve, the latter in vertical section, and partly in full lines; Fig. 2 shows an enlarged portion of Fig. 1, with the locking device in vertical section; Fig. 3 is a section of Fig. 2, on the line 3, 3 with portions in full lines; Fig. 4 shows a section of Fig. 1 on the line 4, 4 and Fig. 5 indicates a section of Fig. 2 on the line 5, 5.

Referring to the drawing the body portion of the outside screw gate valve is shown at 170, with its valve seat 172. The cap 175 is in threaded engagement with said body portion 170, and has integral therewith the members 176 of the yoke of the valve. The upper ends of the members 176 are connected by the disc 178, having the opening 179. The operating screw of the valve is indicated at 182 with the valve per se 183 at its lower end. Upon the disc 178 is supported the housing 185, comprising the annular wall 186, with the threaded opening 187, and the roof 189, with the opening 190. Bolts 191, clamp the wall 186 to the disc 178.

The operating wheel of the valve is shown at 193, with its hub 194, having the hexagonal opening 195.

Upon the disc 178, is supported the operating plug designated in its entirety by the numeral 200. The said plug 200, at its lower end comprises the locking spur gear 202, having the rectangular spaces 203 between its teeth 204. The cylindrical portion 205, of the plug 200, extends from the upper portion of the spur gear 202, and is somewhat smaller in diameter than the outside diameter of the said spur gear 202. From the cylindrical portion 205, extends the hexagonal portion 208, and from the latter extends the threaded cylindrical portion 210. It will be noted that the cylindrical portion 205 registers with the opening 190, and that the hexagonal portion 208, registers with the hexagonal opening 195. A nut 212 engages the threaded portion 210, to clamp the wheel 193 in place. The operating plug 200, is indicated with the internal thread 218, which is in mesh with the operating screw 182.

The locking device for the valve having the body portion 170, comprises the tubular support 220 with the hexagonal portion 222, and the threaded end 224. The opening 225, in the support 220, is shown with the shoulder 226. The outer end 228, of the support 220, is indicated with the opening 229, and the notches 230. A plunger 231, with the head 232, is provided for the support 220.

A cylindrical plug 233, with the rectangular locking projection 234, is fastened to one end of the plunger 231. A helical spring 240 encircles the plunger 231, and bears between the plug 233 and the shoulder 226. To the outer end of the plunger 231, is fastened the operating handle 242, and the locking pin 243 extends through the head 232, and coacts with the notches 230.

A box shaped protector comprises the stationary similar top and bottom walls 250, and the vertical walls 251 and 252. The vertical walls are fastened to the housing 185, as indicated in Fig. 3, at 255 and in a similar manner to the disc 178. A swinging cover with the similar top and bottom walls 258, and the vertical walls 260 and 261, is hinged to the wall 252, as indicated at 263. The walls 251 and 261, are connected by the lock 265.

To operate the locking device illustrated in the drawing, the operator turns the operating wheel 193, and thereby the operating plug 200 is turned as required to either raise or lower the valve 183. The locking spur gear 202, turns with the plug 200, and thereby the operating screw 182, is either raised or lowered. Before the operating wheel 193, is turned the operator disengages the rectangular locking projection 234, from the locking spur gear 202, by pulling the operating handle 242, to lift the locking pin 243 out of the notches 230. The operating handle 242, is then turned about 90 degrees and released when the locking pin 243, will bear on the outer face 228 of the tubular support 220.

After the operating wheel 193, has been turned the required amount, the handle 242, is turned to permit the locking pin 243 to enter the notches 230. At this instant the tension of the spring 240 will force the rectangular locking projection 234, between a pair of teeth 204, of the locking spur gear 202, and the latter will be tightly locked in place to prevent the operating screw 182 either rising or lowering.

Various modifications may be made in the invention and the present modification is to be taken as illustrative and not limitative thereof.

Having described my invention I claim:

1. In combination an outside screw gate valve, a disc having an opening at the outer end of the yoke of the gate valve, a housing supported on said disc and detachably connected thereto, an operating plug having an internal thread extending into said housing, said operating plug having a locking spur gear at the lower portion thereof and having an hexagonal portion adjacent to its upper end, an operating screw in mesh with the thread of said plug, means to turn the plug with its hexagonal portion, a tubular support extending from the housing, said support having notches at its outer end, a spring tensioned plunger in the tubular support, a plug at one end of the plunger, a locking projection integral with said plug and adapted to engage the said locking spur gear, a head at the other end of the plunger, a locking pin extending through the head of the plunger adapted to engage the notches of the tubular support, means to disengage the locking pin from the notches of the tubular support and maintain it out of contact therewith and a box shaped protector for the tubular support and its appurtenances connected to the disc of the gate valve and said housing.

2. In combination an outside screw gate valve, said gate valve comprising a body portion with a valve seat, a cap for the body portion having integral therewith a yoke comprising a pair of members, a disc having an opening at the upper end of the yoke, a housing supported on said disc, means to fasten the housing to said disc, an operating plug having an internal thread extending into said housing, said operating plug having a locking spur gear at the lower portion thereof and having an hexagonal portion adjacent to its upper end, an operating screw in mesh with the internal thread of the operating plug, an operating wheel having an hexagonal opening, said opening in register with hexagonal portion of the operating plug, a tubular support extending from the housing and leading to the interior thereof, said support having notches at its outer end, a spring tensioned plunger in the tubular support, a cylindrical plug at one end of the plunger, a rectangular locking projection integral with the plug and adapted to engage rectangular spaces between the teeth of the locking spur gear, a head at the other end of the plunger, a locking pin extending through the head of the plunger adapted to engage the notches of the tubular support, and an operating handle at the outer end of the plunger adapted to disengage the locking pin from the notches of the tubular support and position it upon the outer end of said support.

3. In combination an outside screw gate valve, a disc having an opening at the outer end of the yoke of the gate valve, a housing supported on said disc and detachably connected thereto, an operating plug having an internal thread extending into said housing, said operating plug having a locking spur gear at the lower portion thereof, an operating screw in mesh with the thread of said plug, means to turn the plug, a tubular support extending from the housing, a spring tensioned plunger in the tubular support, a locking projection integral with one end of said plunger and adapted to engage said locking spur gear and means at the other end of the plunger to disengage and maintain the locking projection disengaged from the spur gear when desired.

4. In combination an outside screw gate valve, said gate valve comprising a body portion with a valve seat, a cap for the body portion having integral therewith a yoke comprising a pair of members, a disc having an opening at the upper end of the yoke, a housing detachably fastened to and supported on said disc, an operating plug having an internal thread in said housing, said operating plug having a locking spur gear at the lower portion thereof, an operating screw extending through and in mesh with the internal thread of the operating plug, an operating wheel, detachably connected to the upper portion of the operating plug, a tubular support extending from the housing and leading to the interior thereof, a spring tensioned plunger in the tubular support, a locking projection at one end of the plunger adapted to engage the spaces between the teeth of the locking spur gear, and means at the other end of the plunger to disengage the locking projection from the spur gear of the operating plug.

EMANUEL LEFKOWITZ.